United States Patent
Geng et al.

(10) Patent No.: US 10,977,719 B2
(45) Date of Patent: Apr. 13, 2021

(54) INTELLIGENT VOICE SHOPPING SYSTEM AND SHOPPING METHOD

(71) Applicant: BOE TECHNOLOGY GROUP CO., LTD., Beijing (CN)

(72) Inventors: Lihua Geng, Beijing (CN); Shu Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 199 days.

(21) Appl. No.: 16/114,071

(22) Filed: Aug. 27, 2018

(65) Prior Publication Data
US 2019/0102828 A1 Apr. 4, 2019

(30) Foreign Application Priority Data

Sep. 29, 2017 (CN) .......................... 201710912282.6

(51) Int. Cl.
*G06Q 30/06* (2012.01)
*G10L 25/03* (2013.01)
(Continued)

(52) U.S. Cl.
CPC ............ *G06Q 30/0641* (2013.01); *G01S 5/18* (2013.01); *G06F 16/60* (2019.01); *G06F 16/901* (2019.01);
(Continued)

(58) Field of Classification Search
CPC .. G06Q 30/0641; G06Q 30/0281; G01S 5/18; G06F 16/9537; G06F 16/901;
(Continued)

(56) References Cited

U.S. PATENT DOCUMENTS

| 8,818,873 B1* | 8/2014 | Kim ................... G06Q 30/0601 705/17 |
| 2006/0291667 A1* | 12/2006 | Watanabe .............. H04R 1/323 381/77 |

(Continued)

FOREIGN PATENT DOCUMENTS

| CN | 101782805 A | 7/2010 |
| CN | 103002376 A | 3/2013 |

(Continued)

OTHER PUBLICATIONS

Chinese Office Action dated May 7, 2020, from application No. 201710912282.6.

*Primary Examiner* — Edwin S Leland, III
(74) *Attorney, Agent, or Firm* — Thomas Horstemeyer, LLP

(57) ABSTRACT

The present disclosure provides an intelligent voice shopping system and method. The system includes: an information collecting device, configured to capture voice information; a data processing device, configured to process the voice information, obtain row and column information of a location of the user, and obtain corresponding voice information of the product from a product information database according to the voice information and the row and column information, wherein the product information database stores in advance a correspondence between voice information of various types of products and the row and column information; and a directional transmission device, configured to send the voice information of the product to the user.

17 Claims, 4 Drawing Sheets

(51) Int. Cl.
  *G10L 15/22* (2006.01)
  *G10L 19/26* (2013.01)
  *G06K 9/00* (2006.01)
  *G06F 16/901* (2019.01)
  *G01S 5/18* (2006.01)
  *G06F 16/9537* (2019.01)
  *G10L 15/26* (2006.01)
  *G06F 16/60* (2019.01)
  *G06Q 30/02* (2012.01)

(52) U.S. Cl.
  CPC ..... *G06F 16/9537* (2019.01); *G06K 9/00369* (2013.01); *G06K 9/00691* (2013.01); *G06Q 30/0281* (2013.01); *G10L 15/22* (2013.01); *G10L 15/26* (2013.01); *G10L 19/26* (2013.01); *G10L 25/03* (2013.01); *G10L 2015/221* (2013.01); *G10L 2015/225* (2013.01)

(58) Field of Classification Search
  CPC ......... G06F 16/60; G10L 25/03; G10L 15/22; G10L 19/26; G10L 2015/221; G10L 2015/225; G10L 15/26; G06K 9/00369; G06K 9/00691
  USPC ....................................................... 704/200
  See application file for complete search history.

(56) References Cited

U.S. PATENT DOCUMENTS

| | | | | |
|---|---|---|---|---|
| 2008/0061973 | A1* | 3/2008 | Cato | A47F 10/02 340/568.5 |
| 2008/0249898 | A1* | 10/2008 | Ratnakar | G06Q 30/0641 705/27.1 |
| 2012/0086549 | A1* | 4/2012 | Barnes, Jr. | H04W 4/029 340/5.61 |
| 2012/0096490 | A1* | 4/2012 | Barnes, Jr. | H04W 4/23 725/34 |
| 2012/0232897 | A1* | 9/2012 | Pettyjohn | G10L 15/22 704/235 |
| 2013/0117082 | A1* | 5/2013 | Sidani | B62B 3/1424 705/14.4 |
| 2014/0214622 | A1* | 7/2014 | Kaneko | G06Q 30/0623 705/26.62 |
| 2015/0264529 | A1* | 9/2015 | Cho | G01S 3/803 455/456.6 |
| 2016/0259341 | A1* | 9/2016 | High | G05D 1/0027 |
| 2018/0075403 | A1* | 3/2018 | Mascorro Medina | G06Q 10/087 |
| 2018/0285422 | A1* | 10/2018 | Sambasivam | G06F 16/2455 |
| 2019/0205468 | A1* | 7/2019 | Barnes, Jr. | G10L 15/26 |

FOREIGN PATENT DOCUMENTS

| | | |
|---|---|---|
| CN | 103783880 A | 5/2014 |
| CN | 104392681 A | 3/2015 |
| CN | 104796497 A | 7/2015 |
| CN | 105929827 A | 9/2016 |
| CN | 206085071 U | 4/2017 |
| CN | 106710594 A | 5/2017 |
| CN | 107198389 A | 9/2017 |

* cited by examiner

INTELLIGENT VOICE SHOPPING SYSTEM AND SHOPPING METHOD

CROSS REFERENCE

The present application claims priority to Chinese Patent Application No. 201710912282.6, filed on Sep. 29, 2017, and the entire contents thereof are incorporated herein by reference.

TECHNICAL FIELD

The present disclosure relates to the field of retailing, and in particular to an intelligent voice shopping system and a shopping method.

BACKGROUND

When customers shop in supermarkets, shops, and other places, they may need to consult the shopping guides of the above locations for some of the unfamiliar goods, such as the production area of vegetable and fruit, a certain method of using skin care products, the size of the clothes, the suitability of a skin care product, or the like.

SUMMARY

In one aspect, the present disclosure provides an intelligent voice shopping system. The intelligent voice shopping system includes an information collecting device, a data processing device, a cloud device, and a directional transmission device. The information collecting device is configured to capture voice information and image information of a user. The data processing device is configured to process the voice information and the image information. The data processing device is also configured to obtain row and column information of a location of the user. The data processing device is also configured to process voice information of a product sent by the cloud device to obtain processed voice information of the product;

The cloud device is configured to retrieve the corresponding voice information of the product from a product information database according to the voice information and the row and column information. The product information database stores in advance a correspondence between voice information of various types of products and the row and column information. The directional transmission device is configured to send the processed voice information of the product to the user.

In an arrangement, the information collecting device includes a voice capturing module and an image capturing module provided on a label of each of the product. The image capturing module is disposed directly above a corresponding voice acquiring module.

In an arrangement, the data processing device includes an image recognition module, a voice encoding and filtering module, a voice amplitude judgment module, and a row/column judging module.

The image recognition module is configured to identify the image information to obtain residence time information and orientation information of the user at a current location. The voice encoding and filtering module is configured to encode and filter the voice information so as to acquire voice information at the first designated frequency. The voice amplitude judgment module is configured to judge an amplitude of the voice information at the first designated frequency to obtain voice information with the highest amplitude. The row/column judging module is configured to obtain the row and column information of the location of the user according to the retention time information, the orientation information, and the voice information with the highest amplitude.

In an arrangement, the intelligent voice shopping system further includes a data transceiving device. The data transceiving device is configured to send the row and column information of the location of the user and the voice information with the highest amplitude to the cloud device.

In an arrangement, the cloud device includes a voice recognition module and an information retrieval module. The voice recognition module is configured to identify the voice information with the highest amplitude to obtain corresponding text information. The information retrieval module is configured to retrieve corresponding voice information of the product from the product information database according to the text information and the row and column information of the location.

In an arrangement, the data processing device further includes a frequency modulation module and a conversion module. The frequency modulation module is configured to perform frequency modulation processing on the voice information of the product to obtain a digital signal at a second designated frequency. The conversion module is configured to convert the digital signal into processed voice information of the product and send the processed voice information of the product to the directional transmission device.

In an arrangement, the data transceiving device is further configured to receive the voice information of the product returned from the cloud device and send the voice information of the product to the data processing device.

In an arrangement, the directional transmission device includes an ultrasonic speaker array corresponding to the voice capturing module. The ultrasonic speaker is configured to directionally send the processed voice information of the product to the user. In an arrangement, the image capturing module is disposed at a center of the corresponding ultrasonic speaker array.

In another aspect, the present disclosure provides an intelligent voice shopping method. The intelligent voice shopping method includes: capturing voice information and image information of a user; processing the voice information and the image information to obtain row and column information of a location of the user; retrieving corresponding voice information of a product from a product information database according to the voice information and the row and column information; processing the voice information of the product to obtain processed voice information of the product; and transmitting the processed voice information of the product to the user. The product information database stores in advance a correspondence between voice information of various types of products and the row and column information.

DETAILED DESCRIPTION

In order to make the above objects, features, and advantages of the present disclosure more comprehensible, the present disclosure will be further described in detail with reference to the accompanying drawings and specific arrangements.

When customers shop in supermarkets, shops, and other places, they need to consult the shopping guides of the above locations for some of the unfamiliar goods. When the number of customers in the above places is relatively large or the number of shopping guides is relatively small, it may possibly cause that the customer's question cannot be promptly answered, thus wasting the customer's time. Increasing the number of shopping guides can cause expenses for supermarkets, shops, and other places, and waste of manpower resources.

Implementation of the present disclosure may solve the problem that customers cannot be answered promptly in the existing solutions, and the waste of cost and manpower if the number of shopping guides is increased.

Arrangement I

Figure 1:
FIG. 1 illustrates a schematic structural diagram of an intelligent voice shopping system according to an arrangement of the present disclosure.

Referring to FIG. 1, a schematic structural diagram of an intelligent voice shopping system provided by an arrangement of the present disclosure is shown. As shown in FIG. 1, the intelligent voice shopping system 100 may include an information collecting device 110, a data processing device 120, a cloud device 130, and a directional sending device 140. In one arrangement, the information collecting device 110 is configured to collect voice information and image information of the user.

In the arrangement of the present disclosure, the information collecting device 110 may include a voice capturing device and an image capturing device. Through the voice capturing device, the user's voice information may be collected, such as the user's question about a product, e.g., "is it suitable for middle-aged people to use it" or "where is the origin?" or the like. The image capturing device can capture user's image information, such as the user's orientation, the residence time before a product, and the like. In one arrangement, the information collecting device 110 includes a voice capturing module 111 and an image capturing module 112 disposed on each product tag.

In an optional arrangement of the present disclosure, the information collecting device 110 may include a voice capturing module and an image capturing module. The voice capturing module may be configured to collect user's voice information, and may be a MIC (Minimal Inhibitory Concentration, microphone) and the like. The image capturing module can be used to capture the user's image information and can be a camera or other device.

In some arrangements, in places such as supermarkets, shopping malls, etc., products are arranged in a line-by-line manner, and product tags are provided on the products corresponding to each row and column for customers to view, and in the arrangement of the disclosure, the voice capturing module and the image capturing module are installed according to the placement of the product. Specifically, referring to FIG. 2, a schematic structural diagram of an installation position of an image capturing module and a voice capturing module provided in an arrangement of the present disclosure is shown.

Figure 2:
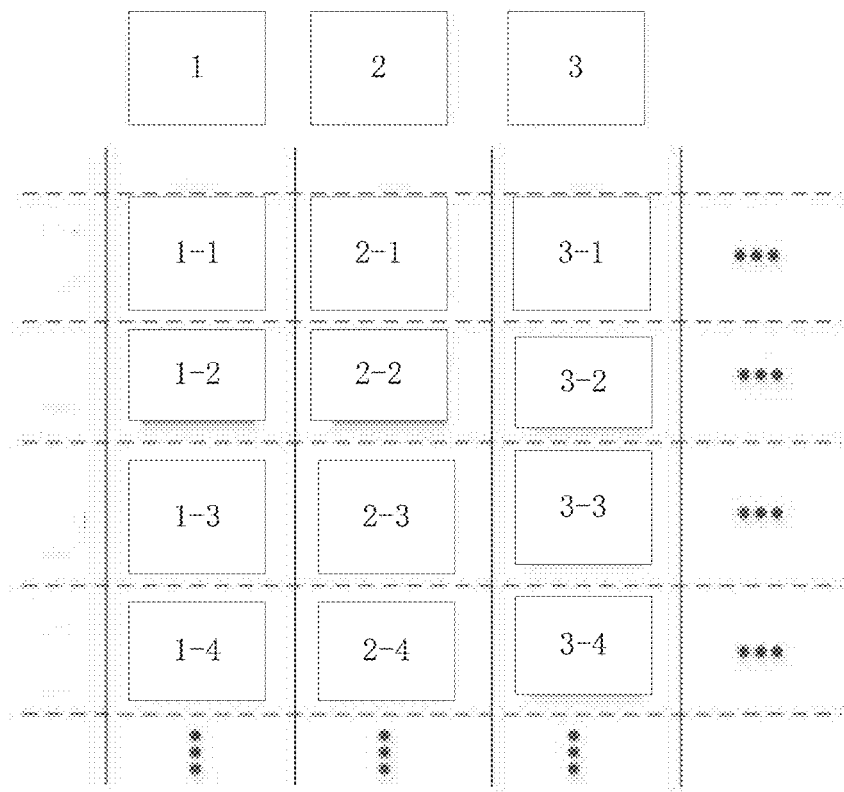
FIG. 2 illustrates installation positions of the image capturing module and the voice capturing module according to an arrangement of the present disclosure.

As shown in FIG. 2, reference numerals 1, 2, and 3 respectively represent image capturing modules, and reference numerals 1-1, 1-2 . . . 3-3 respectively represent voice capturing modules located in each row and column. When the users need to consult a certain product, he/she will generally issue the questioning information at a position ahead of the product. Therefore, in the solution of the arrangement of the present disclosure, a voice capturing module may be provided on each product label to collect the voice information queried by the user, and the image capturing module may be provided above each voice collecting module to capture the user's image information.

It can be understood that the above-mentioned voice capturing module and image capturing module are merely examples for better understanding of the technical solutions of the present disclosure and are not to be construed as the only limitation of the present disclosure.

Specifically, the process of collecting the user's voice information and image information by the information collecting device can refer to the following manners.

Figure 3:
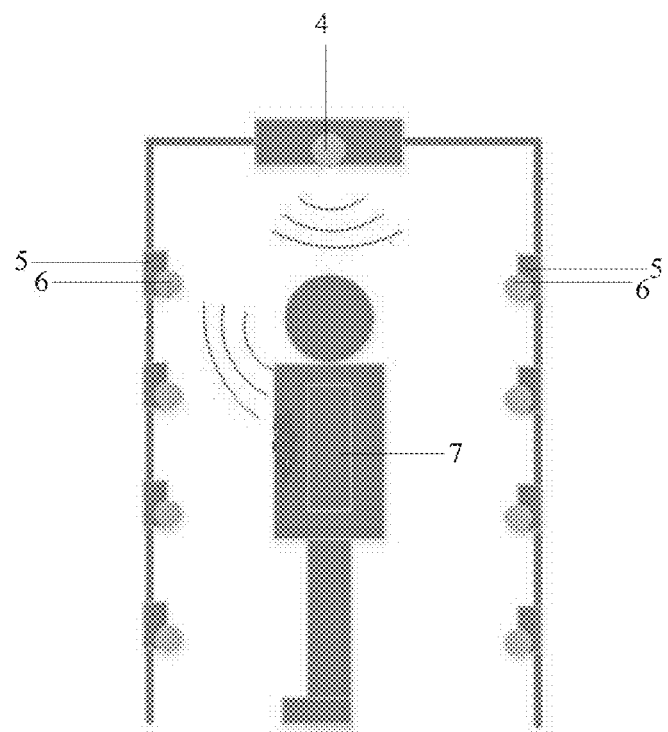
FIG. 3 illustrates a schematic structural diagram of capturing the user voice and image information according to an arrangement of the present disclosure.

Referring to FIG. 3, a schematic structural diagram of collecting user voice and image information provided by an arrangement of the present disclosure is shown. As shown in FIG. 3, the reference numeral 4 represents the image capturing module, the reference numeral 5 represents the merchandise tag, the reference numeral 6 represents the voice capturing module, and the reference numeral 7 represents the user. When the user 7 needs an answers to some information of a certain product, the user directly issues a question about the required information of the product, such as "where is the origin" and the like. The voice capturing module located in front of the user 7 can obtain the voice information of the user 7. Of course, it can be understood that voice capturing modules on other adjacent product tags may also obtain user's question information. In the arrangement of the present disclosure, the amplitude of the voice information received by each voice collection module may be used to determine the row/column where the user is located. The image capturing module located above the voice capturing module can capture the user's image information, analyze the orientation of the user through the captured user images, and the residence time before each product, to determine the product the user is asking.

It can be understood that the above examples are merely examples for better understanding of the technical solutions of the arrangements of the present disclosure. In practical applications, the products can be placed without a sequence or order, only the voice capturing module (such as the MIC, etc.) can be placed on the label of the product, and the image capturing module may be provided on the top of the vertical section of the product label so as to capture the user's voice information and image information.

The data processing device 120 is configured to process the voice information and the image information, obtain the row and column information of the user's location, and process the voice information of the product sent by the cloud device to obtain the processed voice information of the product.

In the arrangements of the present disclosure, in places such as supermarkets, shopping malls and the like, products are usually placed in rows and columns, and it is required to obtain the products corresponding to the questions the user is asking for according to the row/column information of the user's location, thus obtaining the answers required by the user.

The data processing device 120 may receive the user's voice information and image information collected by the information acquiring device 110 and process the voice information and the image information to obtain the row/column information of the user's location. Hereinafter, the manner in which the data processing device 120 obtains the row and column information of the location of the user is described in a specific module description manner. In one arrangement, the data processing device 120 may include the An image recognition module 121, a voice encoding and filtering module 122, a voice amplitude judgment module 123, a row/column judging module 124, and a data transceiving device 150.

The image recognition module 121 is used to identify the image information to obtain the user's residence time information and orientation information at the current location. In the arrangements of the present disclosure, the image recognition module may recognize the image information to identify the time and orientation of the user staying in front of the image capturing module. When the user stays for a time exceeding a preset retention time, the user's orientation information may be sent to the row/column determination module. For example, if the preset retention time is t, when the user stays in front of the first image capturing module for a time exceeding t, the orientation information of the user is sent to the row/column determination module.

The voice encoding and filtering module 122 is configured to encode and filter the voice information so as to acquire the voice information at the first designated frequency. Since the voice information collected by the voice capturing module includes voices in different frequency bands, the collected voice information of the user needs to be digitally encoded and the encoded voice information is filtered to retain the voice information of the first designated frequency, to avoid the influence of the voice of other frequencies. For example, only the voice information of 10-20 KHz frequency is retained, and the voice information of other frequency bands is filtered out.

The voice amplitude judgment module 123 is used for judging the amplitude (loudness) of the voice information at the first designated frequency to obtain the voice information with the highest amplitude. In the arrangement of the present disclosure, when the user asks a question, the user's voice information may be obtained by multiple voice capturing modules. Of course, the user voice information collected by the voice capturing module close to the user has a greater amplitude than the user voice information collected by other voice capturing module. Therefore, it is possible to determine the product that the user needs to ask through the voice amplitude collected by each voice capturing module.

The voice amplitude judgment module included in the data processing device 120 can determine the amplitude of the voice information at the first designated frequency to obtain the voice information with the highest amplitude.

The row/column judging module 124 is configured to obtain the row and column information of the location of the user according to the retention time information, the orientation information, and the voice information with the highest amplitude. The row/column judging module can obtain the number of the row at which the user is located according to the user's retention time and the orientation at a certain position, and determine the column at which the user is located according to the voice information with the highest amplitude, and then determine the row/column information of the user's location.

In an arrangement, the data transceiving device 150 is configured to send the row and column information of the user's location and the voice information with the highest amplitude to the cloud device. After obtaining the row and column information of the location of the user, the data transceiving device may receive the row and column information of the user's location and the voice information with the highest amplitude acquired by the data processing device 120, and sent the row and column information of the user's location and the voice information with the highest amplitude to the cloud device 130.

The cloud device 130 is configured to retrieve the corresponding product voice information from a product information database according to the voice information and the row/column information, wherein the product information database stores in advance a correspondence between voice information of various types of products and the row/column information. In the arrangement of the present disclosure, the cloud device 130 stores in advance a product information database in which the correspondence between voice information of various types of products and the row/column information is stored. For example, the third row and third column correspond to an A brand skin care products. The voice information stored in the product information database includes voice information such as "suitable for middle-aged and old people", "used after night washing", and "contraindicated in pregnancy", etc., so as to satisfy the question posed by the user under normal circumstances, and provide corresponding voice answer.

Therefore, the cloud device 130 may determine the product that the user needs to ask questions according to the row and column information sent by the data transceiver device, and extract the keyword of the question from the voice information, so as to match the corresponding voice information of the product.

In an arrangement, the cloud device 130 includes a voice recognition module 131 and an information retrieval module 132. The voice recognition module 131 is configured to identify the voice information with the highest amplitude to obtain corresponding text information.

The information retrieval module 132 is configured to retrieve corresponding voice information of the product from the product information database according to the text information and the row and column information of the location. In an arrangement, the data transceiving device is further configured to receive the voice information of the product returned from the cloud and send the voice information of the product to the data processing device.

After the cloud device 130 retrieving the corresponding voice information of the product from the product information database, it may return the voice information of the product to the data transceiver device, and the data transceiver device may send the voice information of the product to the data processing device 120 for corresponding processing.

In an optional arrangement described below, the scheme of processing the voice information of the product returned from the data transceiving device by the data processing device 120 will be described in detail.

In one arrangement, the data processing device 120 may further include a frequency modulation module and a conversion module. The frequency modulation module is configured to perform frequency modulation processing on the voice information of the product to obtain a digital signal at a second designated frequency. In the arrangement, the frequency band of the voice information of the product is required to be modulated to the designated frequency to implement directional transmission of the voice information of the product. Therefore, the data processing device 120 also includes an FM module configured to modulate the voice information of the product returned from the data transceiving device to obtain a digital signal at the second designated frequency.

It can be understood that the technology for modulating the voice information is an existing mature technology. Any technology that can modulate the voice can be used, which will not be described in detail in this arrangement of the disclosure.

The conversion module is configured to convert the digital signal into the processed voice information of the product and send the processed voice information of the product to the directional transmission device. After the digital signal is obtained, the digital signal at the second designated frequency is converted by using the conversion module, so that the processed voice information of the product is obtained, and the processed voice information of the product is sent to the directional transmission device 140.

A directional transmission device 140 is configured to send the processed voice information of the product to the user. In the arrangement of the present disclosure, the directional transmission device 140 adopts the technology of directional sounding, and can send the voice information of the product to a specified position so that the user at the specified position can hear it, while the user at other positions will not hear it. In an arrangement, the directional transmission device 140 may include an ultrasonic speaker array 141 corresponding to the voice capturing module. The ultrasonic speaker array is configured to directionally send the processed voice information of the product to the user.

In an optional arrangement of the present disclosure, the directional transmission device 140 may include an ultrasonic speaker array. The ultrasonic speaker array has good directionality, and only the users standing below the array can hear the sound generated by the ultrasonic speaker array. Thus, in the arrangements of the present disclosure, the ultrasonic speaker array may be disposed directly above the voice acquiring module, so that only users below may hear sounds emitted by the ultrasonic speaker array, while users at other positions will not hear it.

For example, ultrasonic directional generation technology provides good directionality, and provides directional transmission of the voice information of the product. Through a modulation technology, voice information of the product (10-20 KHZ) is firstly modulated to a carrier at the ultrasonic frequency band (30K-300 KHz). The voice information is then transmitted directionally through the ultrasonic speaker array while transmitting an empty ultrasonic carrier. When the transmitted voice ultrasonic carrier and empty ultrasonic carrier encounter a blocking, it will produce a difference effect, in which the voice ultrasonic carrier minus empty carrier, to retain the voice information. In this way, the sound can be heard in the direction of ultrasonic transmission and cannot be heard in other directions.

It can be understood that the above examples are merely examples for better understanding of the technical solutions of the arrangements of the present disclosure and are not to be construed as the only limitation of the arrangements of the present disclosure.

Figure 4:
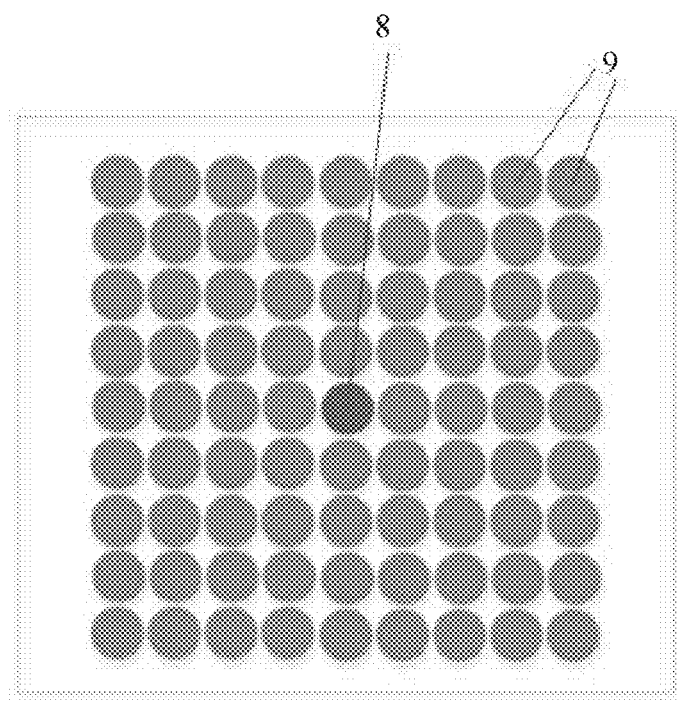
FIG. 4 installation positions of the ultrasonic speaker array and the image capturing module according to an arrangement of the present disclosure.

In some arrangements of the present disclosure, the image capturing module may be disposed at the center of the corresponding ultrasonic speaker array. Referring to FIG. 4, it shows a structural schematic diagram of an installation position of an ultrasonic speaker array and an image capturing module provided by an arrangement of the present disclosure, wherein the reference numeral 8 represents the image capturing module, the reference numeral 9 represents the ultrasonic speaker. By installing the image capturing module at the center of the ultrasonic speaker array, it not only can capture the image information of the user below, but also can reduce the space occupied by the installation.

Through the intelligent voice shopping guide system provided by the arrangement of the present disclosure, row/column information of the location of the user is obtained according to collected voice information and image information of a user, and then the corresponding voice information of the product is retrieved from the product information database of the cloud system according to the voice information and the row/column information. The information is sent to the designated user, so that the user's questions can be promptly answered, and there is no need to increase the shopping guides in supermarkets, shopping centers and other places, which saves expenses and manpower resources.

Arrangement II

Figure 5:
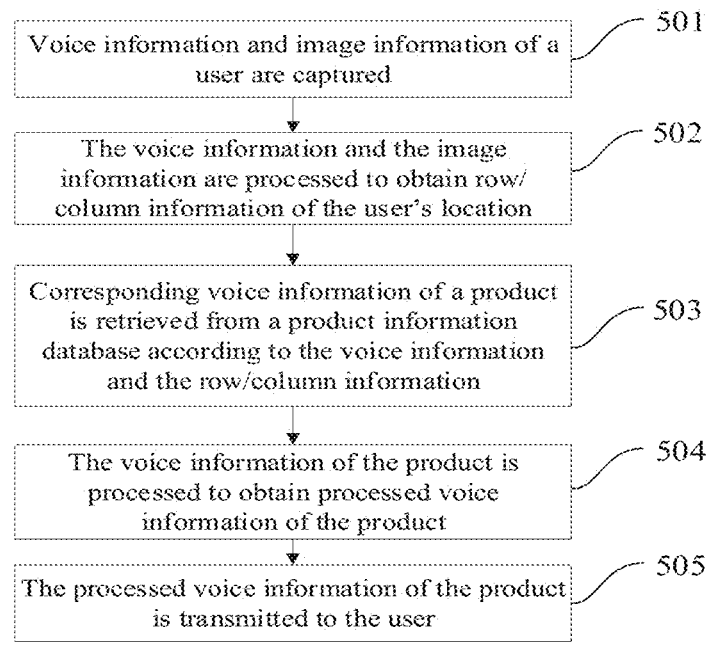
FIG. 5 illustrates a flowchart of the steps of an intelligent voice shopping method according to an arrangement of the present disclosure.
Figure 6:
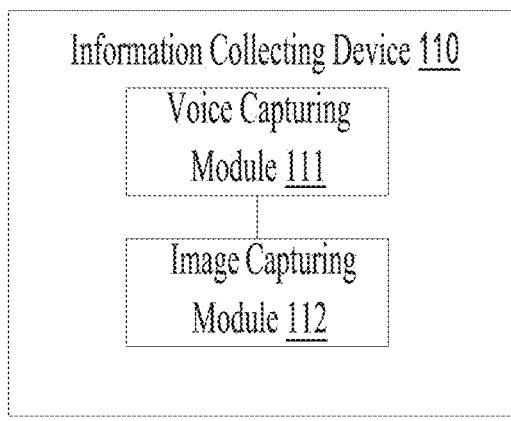
FIG. 6 illustrates a schematic structural diagram of an information collecting device according to an arrangement of the present disclosure.
Figure 7:
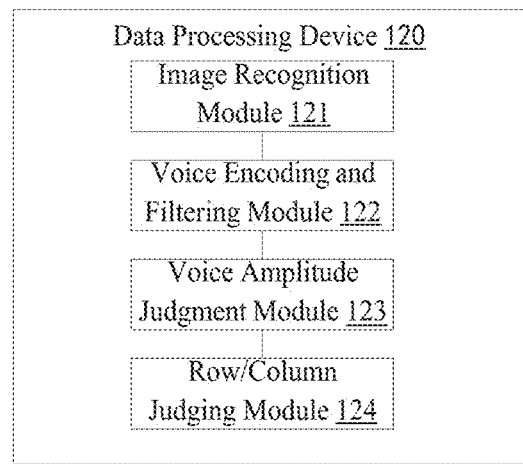
FIG. 7 illustrates a schematic structural diagram of a data processing device according to an arrangement of the present disclosure.
Figure 8:
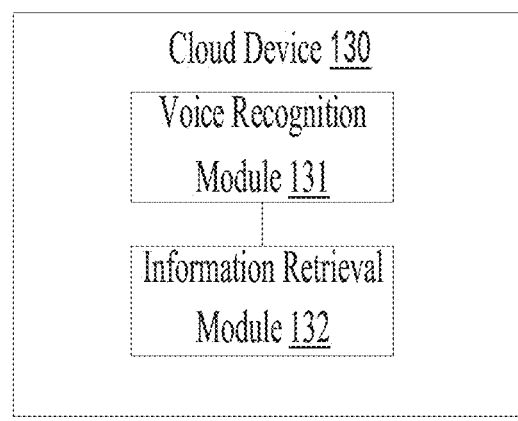
FIG. 8 illustrates a schematic structural diagram of a cloud device according to an arrangement of the present disclosure.
Figure 9:
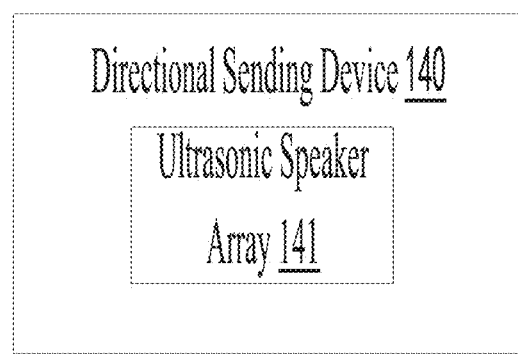
FIG. 9 illustrates a schematic structural diagram of a directional sending device according to an arrangement of the present disclosure.

Referring to FIG. 5, a flowchart of steps of an intelligent voice shopping guide method provided by an arrangement of the present disclosure is shown. The method includes the following steps.

In step 501, voice information and image information of a user are captured.

In step 502, the voice information and the image information are processed to obtain row/column information of the user's location.

In step 503, corresponding voice information of a product is retrieved from a product information database according to the voice information and the row/column information.

In step 504, the voice information of the product is processed to obtain processed voice information of the product.

In step 505, the processed voice information of the product is transmitted to the user.

In some arrangements of the present disclosure, the product information database of the cloud system stores the voice information of the product corresponding to each product, and the corresponding answer information is obtained from the product information database according to the question asked by the user to be sent to the user, so that the user's questions may be answered timely, and there is no need to hire more shopping guides, thus saving manpower resources.

Firstly, the user's voice information and image information are acquired. The voice information includes the question information that the user is asking, such as "how to use", "number of uses per day", "where is the origin", etc., and then, the user's voice information and the image information are processed to obtain the row/column information of the user's location. According to the row and column information, the product that user is asking can be determined. Secondly, the user's voice information and the acquired row and column information of the user's location are sent to the cloud system. The cloud system pre-stores the correspondence between the row and column information and the product. According to the row and column information, the product that user is asking can be determined, and then a keyword is extracted from the user's voice information to clarify the user's question. For example, after determining that the user is asking a skin care product A and the extracted keyword is "applicable people", the corresponding answer information is obtained from the product information database, such as the information of "suitable for the elderly", and then return the information to the customer.

Further, in some arrangements of the present disclosure, the directional sound generation technology is used to send the voice information of the product retrieved from the cloud system to a specified location, i.e., the user's location, while the users in other directions will not hear it.

For example, the ultrasonic directional generation technology provides good directionality, and provides directionally transmission of the voice information of the product. Through a modulation technology, voice information of the product (10-20 KHZ) is firstly modulated to a carrier at the ultrasonic frequency band (30K-300 KHz), and then transmitted directionally through the ultrasonic speaker array while transmitting an empty ultrasonic carrier. When the transmitted voice ultrasonic carrier and empty ultrasonic carrier encounter a blocking, it will produce a difference effect, in which the voice ultrasonic carrier minus empty carrier, to retain the voice information. In this way, the sound can be heard in the direction of ultrasonic transmission and cannot be heard in other directions.

It can be understood that the above examples are merely examples for better understanding of the technical solutions of the arrangements of the present disclosure and are not to be construed as the only limitation of the arrangements of the present disclosure.

The foregoing specific implementation of the voice shopping guide method arrangement and the implementation of the corresponding voice shopping guideline system arrangement are described as simple descriptions, and are not described in detail in this arrangement of the disclosure.

Through the intelligent voice shopping guide method provided by the arrangement of the present disclosure, row/column information of the location of the user is obtained according to collected voice information and image information of a user, and then the corresponding voice information of the product is retrieved from the product information database of the cloud system according to the voice information and the row/column information. The information is sent to the designated user, so that the user's questions can be promptly answered, and there is no need to increase the shopping guides in supermarkets, shopping centers and other places, which saves expenses and manpower resources.

For the foregoing method arrangements, for the sake of simple description, they are all illustrated as combinations of a series of actions, but those skilled in the art should understand that the present disclosure is not limited by the described action sequence because according to the present disclosure, some steps can be performed in other orders or simultaneously. Secondly, those skilled in the art should also understand that the arrangements described in the specification all belong to optional arrangements and the involved actions and modules are not necessarily required by the present disclosure.

Each arrangement in this specification is described in a progressive manner, and each arrangement focuses on the differences from other arrangements. The same or similar parts among the arrangements can be referred to each other.

Finally, it should also be noted that in this paper, relational terms such as first and second, etc., are only used to distinguish one entity or operation from another entity or operation, and do not necessarily require or imply that there is any such actual relationship or order among these entities or operations. Moreover, the terms "include", "including" or any other variation thereof are intended to cover a non-exclusive inclusion such that a process, method, product, or apparatus that includes a list of elements includes not only those elements but also includes those that are not explicitly listed, or further includes elements that are inherent to such processes, methods, products, or apparatus. In the case of no more limitation, the element defined by the sentence "includes a . . . " does not exclude the existence of another identical element in the process, the method, the product, or the apparatus including the element.

The foregoing describes an intelligent voice shopping system and method provided by the present disclosure in detail. Specific examples are used herein to describe the principles and arrangements of the present disclosure. The above arrangements are only used to help understand the method and its core concept of the present disclosure. At the same time, those of ordinary skill in the art, according to the concept of the present disclosure, will have changes in the specific implementation and application range. To sum up, the contents of this specification should not be understood as limitations of the present disclosure.

What is claimed is:

1. An intelligent voice shopping system, comprising:
    a microphone and a camera provided on a label of a product configured to capture voice information and image information of a user, respectively;
    a computing device configured to process the voice information, obtain row and column information of a location of a user, and obtain corresponding voice information of a product from a product information database according to the voice information and the row and column information, wherein the product information database stores in advance a correspondence between voice information of various types of products and the row and column information; and
    a plurality of speakers configured to send the voice information of the product to the user,
    wherein the computing device is further configured to process the voice information and the image information to obtain the row and column information of the location of the user.

2. The system according to claim 1, further comprising:
    a cloud computing device located remotely from the computing device configured to store the product information database and retrieve the voice information of the product from the product information database according to the voice information and the row and column information; and
    a transceiver configured to send the voice information and the row and column information to the cloud computing device over a network, and send the voice information of the product to the computing device.

3. The system according to claim 1, wherein the computing device is further configured to judge an amplitude of the voice information and obtain the row and column information of a location of the user according to voice information with a highest amplitude.

4. The system according to claim 1, wherein the camera is disposed directly above the microphone.

5. The system according to claim 1, wherein the plurality of speakers comprise an ultrasonic speaker array configured to directionally send the voice information of the product to the user.

6. The system according to claim 1, wherein the plurality of speakers comprise an ultrasonic speaker array configured to directionally send the voice information of the product to the user.

7. The system according to claim 6, wherein the camera is disposed at a center of the ultrasonic speaker array.

8. An intelligent voice shopping system, comprising:
a microphone configured to capture voice information of a user;
a camera configured to capture image information of the user;
a computing device configured to process the voice information, obtain row and column information of a location of a user, and obtain corresponding voice information of a product from a product information database according to the voice information and the row and column information, wherein the product information database stores in advance a correspondence between voice information of various types of products and the row and column information; and
a plurality of speakers configured to send the voice information of the product to the user,
wherein the computing device is further configured to:
analyze the image information to obtain residence time information and orientation information of the user at a current location;
encode and filter the voice information so as to acquire voice information at a first designated frequency; and
obtain the row and column information of the location of the user according to the retention time information and the orientation information.

9. The system according to claim 8, further comprising:
a cloud computing device located remotely from the computing device configured to store the product information database and retrieve the voice information of the product from the product information database according to the voice information and the row and column information; and
a transceiver configured to send the voice information and the row and column information to the cloud computing device, and send the voice information of the product to the computing device.

10. The system according to claim 9, wherein the cloud computing device is further configured to:
identify the voice information with the first designated frequency to obtain corresponding text information; and
retrieve the corresponding voice information of the product from the product information database according to the text information and the row and column information of the location.

11. The system according to claim 10, wherein the computing device is further configured to:
perform frequency modulation processing on the voice information of the product to obtain a digital signal at a second designated frequency; and
convert the digital signal at the second designated frequency into processed voice information of the product and send the processed voice information of the product to the plurality of speakers.

12. The system according to claim 9, wherein the computing device is further configured to:
judge an amplitude of the voice information at the first designated frequency to obtain voice information with the highest amplitude, and
obtain the row and column information of the location of the user according to the retention time information, the orientation information, and the voice information with the highest amplitude.

13. The system according to claim 12, wherein the cloud computing device is further configured to:
identify the voice information with the highest amplitude to obtain corresponding text information; and
retrieve the corresponding voice information of the product from the product information database according to the text information and the row and column information of the location.

14. The system according to claim 13, wherein the computing device is further configured to:
perform frequency modulation processing on the voice information of the product to obtain a digital signal at a second designated frequency; and
convert the digital signal at the second designated frequency into processed voice information of the product and send the processed voice information of the product to the directional transmission device.

15. An intelligent voice shopping method, comprising:
capturing voice information and image information of a user;
processing the voice information to obtain row and column information of a location of the retrieving corresponding voice information of a product from a product information database according to the voice information, wherein the product information database stores in advance a correspondence between voice information of various types of products and the row and column information; and
transmitting the voice information of the product to the user,
wherein the processing the voice information to obtain row and column information of the location of the user comprises:
identifying the image information to obtain residence time information and orientation information of the user at a current location;
encoding and filtering the voice information so as to acquire voice information at a first designated frequency; and
obtaining the row and column information of the location of the user according to the retention time information, and the orientation information.

16. The method according to claim 15, wherein
the capturing voice information of a user further comprises capturing image information of the user, and
the processing the voice information further comprises processing the voice information and the image information to obtain the row and column information of the location of the user.

17. The method according to claim 15, further comprising processing a digital signal to obtain processed voice information of the product as the voice information of the product to be transmitted by a directional transmission device.

* * * * *